No. 881,383. PATENTED MAR. 10, 1908.
J. M. DOHAN.
APPARATUS FOR RECLAIMING MATTER DISCHARGED IN THE MANUFACTURE OF PULP AND PAPER.
APPLICATION FILED AUG. 15, 1907.

2 SHEETS—SHEET 1.

WITNESSES:

INVENTOR
Jos. M. Dohan
BY
Chas. N. Butler
ATTORNEY.

UNITED STATES PATENT OFFICE.

JOSEPH M. DOHAN, OF DARLINGTON, PENNSYLVANIA.

APPARATUS FOR RECLAIMING MATTER DISCHARGED IN THE MANUFACTURE OF PULP AND PAPER.

No. 881,383.     Specification of Letters Patent.     Patented March 10, 1908.

Application filed August 15, 1907. Serial No. 388,582.

*To all whom it may concern:*

Be it known that I, JOSEPH M. DOHAN, a citizen of the United States, residing at Darlington, in the county of Delaware and State of Pennsylvania, have invented certain Apparatus for Reclaiming Matter Discharged in the Manufacture of Pulp and Paper, of which the following is a specification.

This invention is an apparatus for circulating and baffling liquid to precipitate solids therein with the object of reclaiming the water, pulp and other valuable constituents discharged in the manufacture of pulp and paper. To this end the "white water" from the process of manufacture is flowed through baffling courses having means for setting up counter currents and checking the rate of flow to effect the precipitation of solid matter and the separation of the clarified water therefrom, a series of receptacles being provided for securing successive sedimentations and clarifications with storage so that both water and solids can be obtained in the condition desired.

The further characteristics of the improvements will appear from the following description and the accompanying drawings in illustration thereof.

Figures 1, 2:
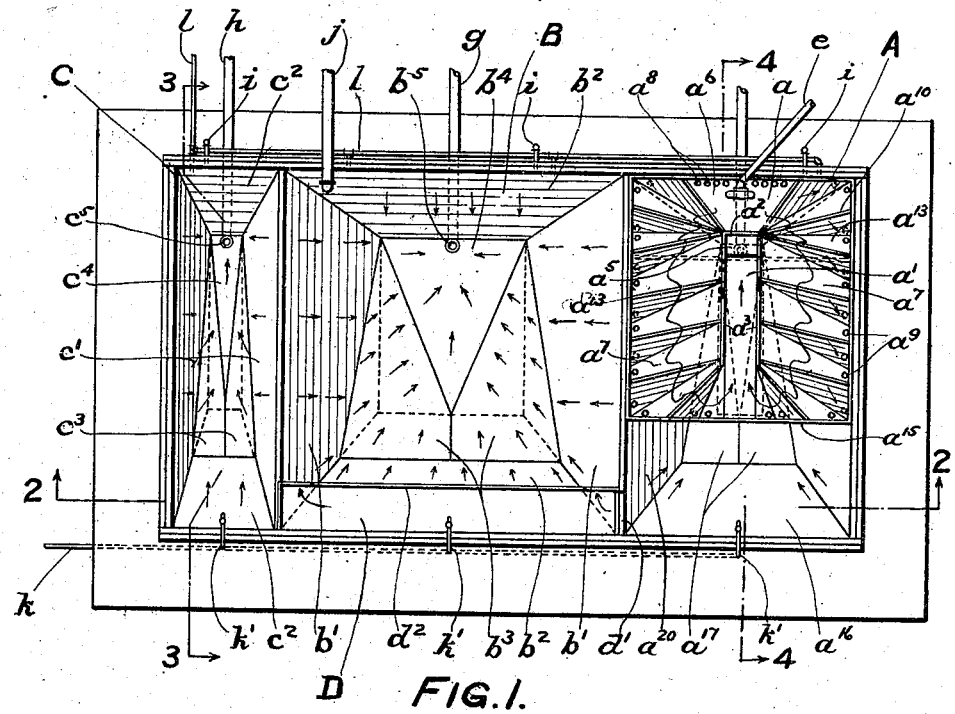
Figure 3:
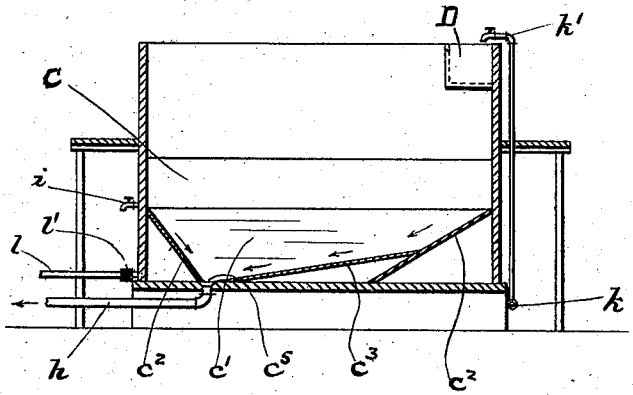
Figure 4:
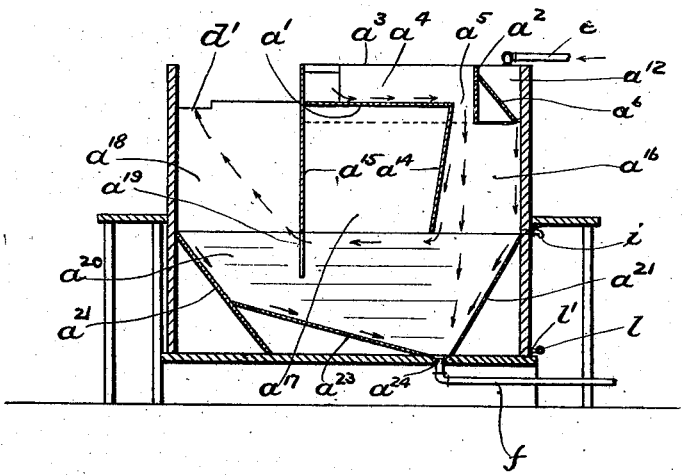

In the drawings, Figure 1 represents a plan view of apparatus embodying the improvements, Fig. 2 represents a sectional view thereof taken on the line 2—2 of Fig. 1, Fig. 3 represents a sectional view thereof taken on the line 3—3 of Fig. 1, and Fig. 4 represents a sectional view thereof taken on the line 4—4 of Fig. 1.

The apparatus, as illustrated, comprises the tanks A, B, and C arranged so that the liquid may pass through them in succession. The precipitating tank A has in its top a floor $a^1$ above which rise the partitions $a^2$ and $a^3$ which form a channel $a^4$ terminating in the outlet $a^5$. Floors $a^6$ and $a^7$ extend from these partitions downwardly to the outer walls of the tank to form channels communicating with the channel $a^4$, these floors having the restricted openings $a^8$ and $a^9$ in the outer portions thereof. Riffle boards $a^{10}$ rise from the floors $a^7$ to baffle the channel, forming the compartments $a^{12}$ and $a^{13}$; the boards being inclined so that they form with the walls and floors acute trihedral angles extending in the direction of flow. Depending from the said floors are partitions $a^{14}$ and $a^{15}$ which form the compartments $a^{16}$, $a^{17}$ and $a^{18}$, the partition $a^{15}$ having therein the notch $a^{19}$. At the bottom of this tank is a floor composed of the sections $a^{20}$, $a^{21}$, $a^{22}$ and $a^{23}$ which extend inwardly and downwardly to the outlet $a^{24}$ and form a basin whose walls are pitched beyond the angle of repose of the fiber. The settling and storage tank B is provided with a bottom composed of the sections $b^1$, $b^2$, $b^3$ and $b^4$ which extend inwardly and downwardly to an outlet $b^5$ and form a basin with walls pitched beyond the angle of repose of the fiber. The supply tank C is provided with a bottom having the sections $c^1$, $c^2$, $c^3$, and $c^4$ inclined inwardly and downwardly to the outlet $c^5$; the basin thus formed having walls pitched beyond the angle of repose of the fiber.

A coagulating trough D connects the tank A with the tank B, having an inlet $d^1$ in the form of a weir communicating with the top of the tank A and an outlet $d^2$ in the form of a weir communicating with the tank B. The tank B overflows into the tank C. The "white water", or liquid containing solids, is delivered by a pipe $e$ to the compartment $a^{12}$, whence the bulk of it flows through the compartments $a^{13}$ and the channel $a^4$ to the outlet $a^5$, which delivers it to the compartment $a^{16}$, the baffles $a^{10}$ causing the precipitation of solid matter, which is carried downwardly through the floor and along the tank walls to the basin by the currents flowing through the holes $a^8$ and $a^9$. The comparatively large volume of water in the compartments $a^{16}$, $a^{17}$ and $a^{18}$ is comparatively still and solids contained therein are deposited and collected in the basin, diverging currents being induced by the escape of the clarified water through the weir $d^1$ and the coagulated matter through the pipe $f$, such matter being returned for incorporation in the process of manufacture. The clarified water is delivered to the trough D, which may contain alum or other coagulant for effecting further clarification, and flows thence into the tank B, whence it overflows into the tank C. Subsidence and further deposition of any solids that may remain is effected in these latter tanks, particularly the tank B, and the lower strata containing any solid matter may be drawn off through the respective pipes $g$ and $h$ and thereafter the clarified water is discharged through the same channels but preferably through the pipe $h$, the different strata of different character being diverted to their appropriate use. It will be understood that the water which overflows from the tank B into the tank C is usually free of solids and this is intended and drawn for use at any stage of the process of manufacture where clear water is desired. The valved outlets $i$ provide means for testing the contents of the tanks. The pipe $j$ serves to return for storage water of suitable character directly to the tank B. The pipe $k$ having branches $k'$ and the pipe $l$ having branches $l'$ are used for washing down and draining the tanks and trough.

Having described my invention, I claim:—

1. In apparatus of the class described, a tank having a channel containing riffle boards, a compartment or compartments into which said channel discharges, means for drawing precipitated matter from the bottom of said compartment or compartments, and means for draining off the clarified liquid in said compartment or compartments from the upper strata thereof.

2. In apparatus of the class described, a series of communicating compartments separated by riffle boards forming a baffled channel, a plurality of communicating compartments separated by one or more partitions forming a baffled chamber, said compartments last named being beneath and receiving the discharge from said first compartments, means for drawing off precipitated matter from the lower strata of said chamber and means for drawing off liquid from the upper strata of said chamber.

3. In apparatus of the class described, a series of compartments having inclined bottoms with holes therein and inclined partitions, in combination with a settling chamber beneath said compartments.

4. In apparatus of the class described, a channel having an inclined bottom with holes therein, inclined riffle boards forming compartments in said channel, an open channel into which said channel first named discharges, and a settling chamber into which said channel last named discharges.

5. In apparatus of the class described, a channel containing riffle boards, a settling chamber beneath and to which said channel discharges, said chamber having a bottom with inclined walls, and means for discharging said chamber through said bottom.

6. In apparatus of the class described, a tank having means for circulating and baffling a liquid, means for inducing diverging currents and separately discharging the upper and lower strata of the contents of said tank, and a second tank connected and receiving the overflow from said first tank.

7. In apparatus of the class described, a tank having means for precipitating solids from liquids with outlets at the bottom and top thereof for withdrawing respectively precipitated matter and liquid from which it is precipitated, a coagulating compartment into which said liquid is discharged from said tank by said top outlet, and a settling and storage tank into which said coagulating compartment discharges.

8. In apparatus of the class described, a tank having means for circulating and baffling a liquid to effect precipitation of solids therein, said tank having a lower outlet for discharging solids and an upper outlet for discharging liquid, a trough into which said tank discharges liquid through said outlet, a settling and storage tank into which said trough discharges, and a supply tank into which said settling and storage tank overflows.

In witness whereof I have hereunto set my name this 13th day of August, 1907, in the presence of the subscribing witnesses.

JOSEPH M. DOHAN.

Witnesses:
CHARLES N. BUTLER,
ROBERT JAMES EARLEY.